US007016615B1

(12) United States Patent
Lenz et al.

(10) Patent No.: US 7,016,615 B1
(45) Date of Patent: Mar. 21, 2006

(54) SYSTEM COMPRISING A SINGLE-STAGE ALL-PASS OPTICAL FILTER

(75) Inventors: Gadi Lenz, Fanwood, NJ (US); Christi Kay Madsen, South Plainfield, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/493,710

(22) Filed: Jan. 28, 2000

(51) Int. Cl.
    H04B 10/00 (2006.01)
(52) U.S. Cl. .................. 398/193; 398/192; 398/194; 398/199; 398/201
(58) Field of Classification Search ........ 398/192–194, 398/199, 201; 385/32; 359/577–590, 885–892, 359/615
    See application file for complete search history.

(56) References Cited

U.S. PATENT DOCUMENTS

| | | | |
|---|---|---|---|
| 5,258,716 A | | 11/1993 | Kondo et al. |
| 5,329,393 A | | 7/1994 | Huang |
| 5,432,296 A | | 7/1995 | Takeuchi et al. |
| 5,557,468 A | * | 9/1996 | Ip ............................. 359/615 |
| 6,289,151 B1 | * | 9/2001 | Kazarinov et al. ........... 385/32 |
| 2003/0210864 A1 | * | 11/2003 | Sugden et al. ............... 385/37 |

OTHER PUBLICATIONS

Harvey, G. T. "Harmonically mode locked fiber ring laser with an internal Fabry-Perot stabilizer for soliton transmission." Jan. 1993, Optical Letters, pp 107-109.*
Harvey GT et al.: "Harmonically Mode-Locked Fiber Ring Laser With An Internal Fabry-Perot Stabilizer for Soliton Transmission", Optics Letters, US, Optical Society of America, Washington, vol. 18, No. 2, Jan. 15, 1993, pp. 107-109.
Madsen CK et al.: "Optical All-Pass Filters for Phase Response Design With Applications For Dispersion Compensation", IEEE Photonics Technology Letters, US, IEEE Inc. New York, vol. 10, No. 7, Jul. 1, 1998, pp. 994-996.
Lenz G et al.: "General Optical All-Pass Filter Structures For Dispersion Control in WDM Systems", Journal of Lightwave Technology, IEEE. New York, US, vol. 17, No. 7, Jul. 1999, pp. 1248-1254.
Cimini LJ et al: "Optical Equalization to Combat the Effects of Laser Chirp and Fiber Dispersion", Journal of Lightwave Technology, US, IEEE. New York, vol. 8, No. 5, May 1, 1990, pp. 649-659.

* cited by examiner

Primary Examiner—Agustin Bello

(57) ABSTRACT

A single-stage all-pass optical filter is disclosed that may be applied to generate a large tunable delay of an optical pulse train. The all-pass optical filter includes an input port for receiving an input optical pulse having a regular repetition rate; an output port; a splitter/combiner; and one feedback path. A plurality of frequency-dependent time delay periods are applied to the input optical pulse so that the filter is characterized by a time-delay spectrum having a plurality of delay peaks. The free-spectral range (FSR) of the filter, i.e., the spacing between the delay peaks, is matched to the regular repetition rate of the input optical pulse. This matching is accomplished by the FSR being equal to the repetition rate or offset from the repetition rate to a sufficiently small degree that each frequency of the pulse train will fall within the bandwidth of one of the plurality of delay peaks. This single-stage all-pass optical filter is advantageous for correcting linear chirp of a pulsed laser or synchronizing control signals in an optical time-division multiplexer/demultiplexer system.

10 Claims, 7 Drawing Sheets

SYSTEM COMPRISING A SINGLE-STAGE ALL-PASS OPTICAL FILTER

FIELD OF THE INVENTION

The present invention relates to optical communications systems and more particularly, to an article comprising a single-stage all-pass optical filter.

BACKGROUND OF THE INVENTION

Optical communications systems typically include a variety of devices (e.g., light sources, photodetectors, switches, optical fibers, amplifiers, filters, and so forth). Optical communications systems are useful for transmitting optical signals over long distances at high speeds. An optical signal, which comprises a series of light pulses, is transmitted from a light source such as a laser to an optical fiber and ultimately to a detector. Amplifiers and filters may be used to propagate the light pulses along the length of the fiber from the light source to the detector. Today, the bulk of long-distance communication traffic is carried by optical fibers. As use of optical fibers becomes more widespread and infiltrates the consumer marketplace, demand is increasing for efficient, high-speed, integrated opto-electronic devices.

There are many considerations and design constraints in developing optical systems. One consideration relates to signal synchronization in a wavelength division multiplexer or demultiplexer and/or optical time-division multiplexer (OTDM) device. Optical communications systems may include such devices for coupling, splitting, or filtering co-propagating pump signals. For example, FIG. 1 reflects a schematic representation of an OTDM system, comprising a time-division multiplexer (TDM) 100 which includes a plurality of low-speed transmitters 102, 103, 104 and a multiplexer 105, an optical switch or demultiplexer 110, and a receiver 115, connected by trunk fiber 11. Each of the transmitters sends low speed signals ($s_L$) to the multiplexer 105 which then outputs a high speed signal ($s_H$) to the switch 110. The switch selectively drops pulses from the high-speed signal to produce low-speed output signals ($s_O$) sent to receiver 115. In this way, the signals may be sent at high-speed over the length of the fiber between the multiplexer 105 and the switch 110, and then interpreted at low speed to determine the information sent from each one of the transmitters.

Such OTDM communication systems require synchronization elements. For example, when the optical switch 110 demultiplexes a high bit-rate signal, a low bit-rate control "C" needs to be synchronized with the high bit-rate signal so that the signals coincide correctly in time inside the switch. This operation requires a delay line, e.g., the control will need to be delayed so it is synchronized inside the switch with the high bit-rate signal. A challenge in designing optical switches involves achieving a delay for a pulse train so that each of the frequencies of the pulse train is delayed for the same period of time. For example, FIG. 2 is a graphical illustration showing the spectrum of an unmodulated pulse train. In FIG. 2, an optical pulse 10 typically comprises a packet of waves 15a, 15b, 15c . . . 15g. Each wave has a certain amplitude and frequency within the bandwidth $\Delta f$, e.g., each wave within the packet is characterized by a different frequency and amplitude and travels at a different speed. Challenges are involved in achieving a constant time delay for each of the frequencies over the entire bandwidth $\Delta f$. If certain frequencies of the pulse train (e.g. 15a, 15b), are not delayed or are given a different period of delay than other frequencies (e.g., 15c, 15d), the delayed signal will not correspond in phase with the original pulse train.

All-pass filters have been known in the field of electronics for equalizing phase and reducing distortion. Structures for fabricating all-pass filters for electronic devices are known in the field and described in the literature. See, e.g., U.S. Pat. No. 5,258,716 to Kondo et al., "All-Pass Filter." All-pass filters provide advantages over other types of filters as they affect only the phase of a signal, rather than its amplitude. A configuration for an all-pass filter for use with optical devices is described in co-pending U.S. patent application Ser. No. 09/182,980, titled "All-Pass Optical Filter," filed by Kazarinov et al. and the inventors herein, which is assigned to the present assignee and incorporated herein by reference. As explained in the Kazarinov et al. application (and shown in FIG. 2B thereof), an optical signal transmitted through a fiber may be distorted or broadened with time over the length of the fiber. This broadening is undesirable as it may create noise, i.e., interference between sequential optical pulses. The Kazarinov et al. application describes an all-pass optical filter designed to eliminate such distortion. Additionally, it was disclosed therein that the all-pass optical filter could be useful in delaying an optical pulse in time. The all-pass optical filter of the Kazarinov et al. application applies a frequency-dependent time delay to each frequency of the optical pulse.

The Kazarinov et al. application describes single-stage and multiple-stage all-pass optical filters. A schematic representation of one embodiment a single-stage all-pass optical filter according to the Kazarinov et al. application is illustrated in FIG. 3. The filter comprises an input port for an input optical pulse 120, an output port 150, a splitter/combiner 143, and a feedback path 145 wherein the feedback path advantageously comprises at least one ring resonator. Although FIG. 3 shows a single-stage filter (e.g., a single resonator ring), the Kazarinov et al. application discloses that best results are achieved when multiple stages (multiple resonator rings) are used. Indeed, the Kazarinov et al. application teaches that many all-pass stages are needed to generate a large tunable delay for an arbitrary broadband signal. For example, FIG. 4 is a graph of the group delay in units of time as a function of frequency for a four-stage all pass optical filter as applied to an arbitrary broadband signal. As can be seen, a maximum and fairly constant delay of 16 au (arbitrary units) is achieved over the normalized frequency range of 0.4 to 0.6. Thus, only certain frequencies would receive the maximum delay. A single all-pass optical filter would achieve a constant delay over a much smaller frequency range (~0.05) and thus would be ineffective in delaying a pulse train having a large bandwidth ($\Delta f$). On the other hand, many all-pass stages would increase the bandwidth ($\Delta f$) of the maximum delay period and also lessen the ripple effect. As can be seen, with the four-stage all pass optical filter, a ripple effect is created over the delay period in that four separate summits appear at the maximum height of the delay peak.

However, use of many all-pass stages translates to more complicated systems than if a single-stage all pass filter were used. Preferably, two heaters are deposited on each resonator ring of the device for locally changing the free-spectral range of the group delay and the desired phase. Thus, the four-stage all-pass optical filter used to produce the delay peak shown in FIG. 4 would include the use of eight heaters, each of which would be need to be periodically adjusted depending on the optical signal and desired phase response.

As may be appreciated, those in the field of communications systems continue to seek new designs to improve system performance and reduce cost. In particular, it would be advantageous to have an article comprising a single-stage all-pass optical filter for correcting dispersion and introducing a constant delay. It would be particularly beneficial to provide an all-pass optical filter that can generate a large tunable delay for a broadband signal without use of many all-pass stages.

SUMMARY OF THE INVENTION

Summarily described, the invention embraces an article comprising a single-stage all-pass filter. The all-pass optical filter includes an input port for receiving an input optical pulse having a regular repetition rate; an output port; a splitter/combiner; and one feedback path. The all-pass optical filter is configured to apply a plurality of frequency-dependent time delay periods to the input optical pulse so that the filter is characterized by a time-delay spectrum having a plurality of delay peaks. The free-spectral range (FSR) of the filter, i.e., the spacing between the delay peaks, is matched to the regular repetition rate of the input optical pulse. This matching is accomplished by the FSR being equal to the repetition rate or offset from the repetition rate to a sufficiently small degree that each frequency of the pulse train will fall within the bandwidth of one of the plurality of delay peaks. Advantageously at least one heater is disposed on the feedback path for use in tuning the time-delay spectrum of the filter. The article including the single-stage all-pass optical filter may comprise an assembly for use in a communications system including an OTDM device or a pulsed laser.

BRIEF DESCRIPTION OF THE DRAWINGS

For a better understanding of the invention, an exemplary embodiment is described below, considered together with the accompanying drawings, in which.

It is to be understood that these drawings are for the purposes of illustrating the concepts of the invention and are not to scale.

DETAILED DESCRIPTION OF THE INVENTION

The invention comprises a single stage all-pass optical filter that can be used to generate a large tunable delay for a regular unmodulated pulse train. Applicants have discovered that when the pulse train for a signal has a regular repetition rate (i.e., each of the frequencies of the pulse train differs from another frequency of the pulse train by an equal amount), a single-stage all-pass optical filter can be used to generate a large tunable delay for the signal. Additionally, applicants have discovered that when the repetition rate is regular, as defined above, a single-stage all-pass filter can be effective in correcting certain dispersion such as the linear chirp of a pulsed laser. These functions are accomplished by configuring the all-pass optical filter so that the free spectral range (FSR) of the filter, i.e., the spacing between the frequency-dependent time delay peaks generated by the filter, is matched to the repetition rate of the regular unmodulated pulse train input to the filter. By "matched to" it is meant that FSR is either equal to the repetition rate or is off-set from the repetition rate by a sufficiently small degree that each frequency of the pulse train will fall within the bandwidth of a peak of the normalized group delay.

Figure 3:
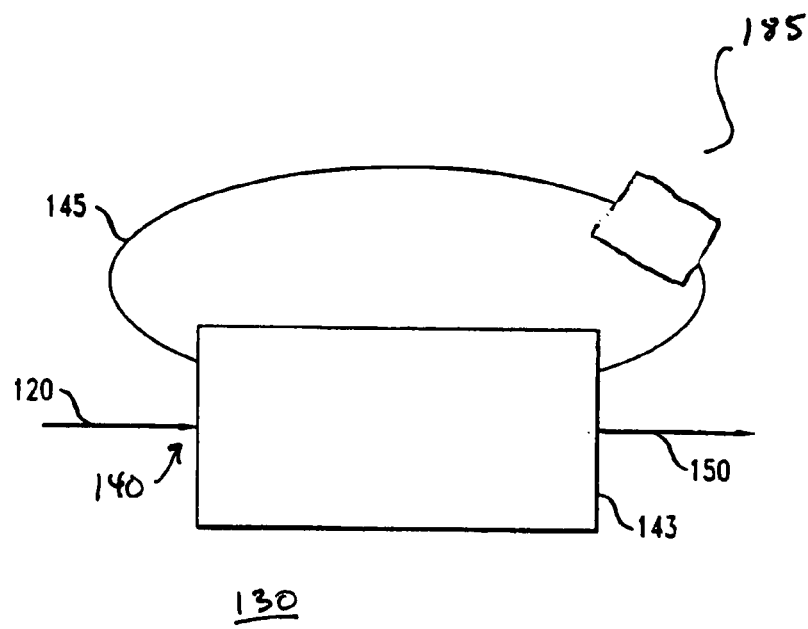
FIG. 3 is a schematic representation of a single-stage all-pass optical filter wherein the feedback path includes a ring resonator.
Figure 4:
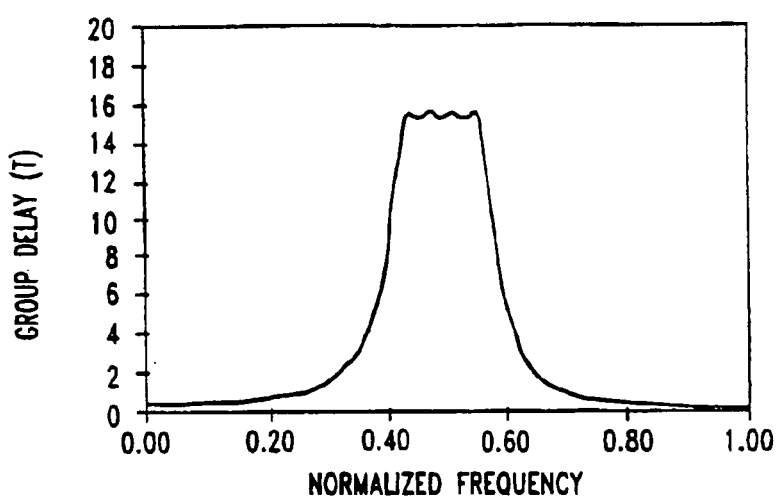
FIG. 4 is a graph illustrating the normalized group delay as a function of frequency for a four-stage all-pass optical filter as applied to an arbitrary broadband signal.

More particularly with reference to the figures, one embodiment of the all-pass optical filter of this invention is schematically represented by the structure of FIG. 3. This all-pass optical filter 130 includes a feedback path 145, an input port 140 for receiving optical pulse 120, an output port 150, and a splitter/combiner 143 for coupling portions of the input optical pulse into and away from the feedback path 145. The feedback path of the all-pass optical filter may have a ring resonator structure, as schematically shown. According to the invention, only one ring resonator structure is used and yet a large tunable delay or chirp correction is achieved, thus providing advantages over the filter of the Kazarinov et al. application. A heating element 185 is advantageously disposed on the ring.

Figure 1:
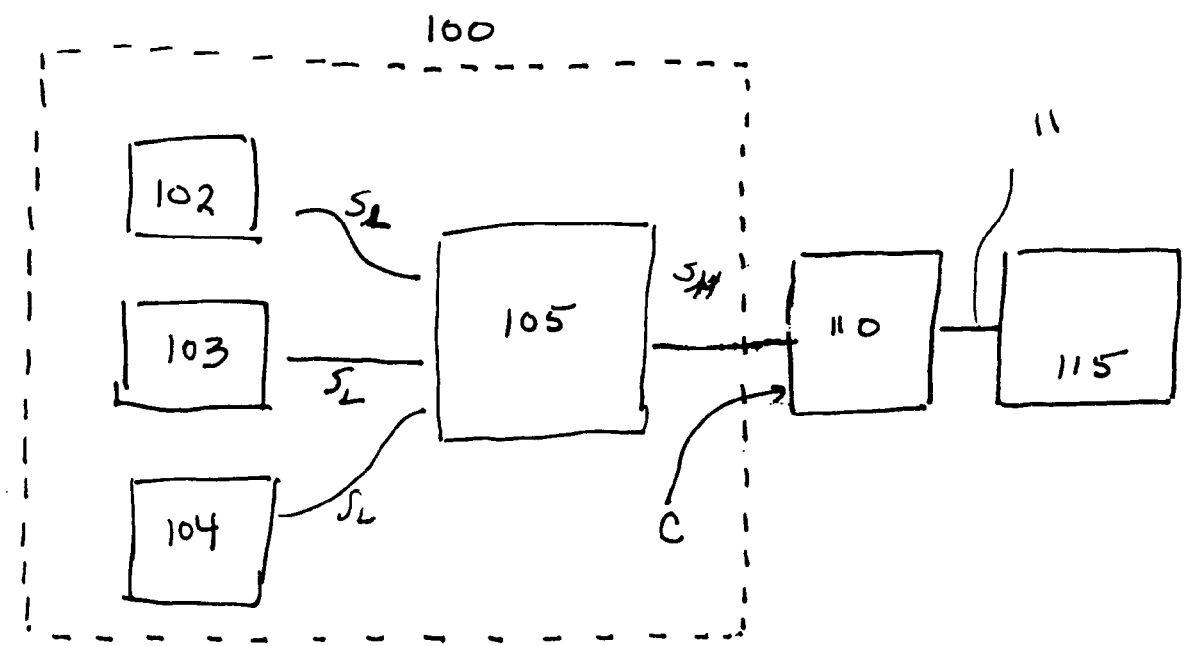
FIG. 1 is a schematic representation of an optical time-division multiplexer/demultiplexer system.
Figure 2:
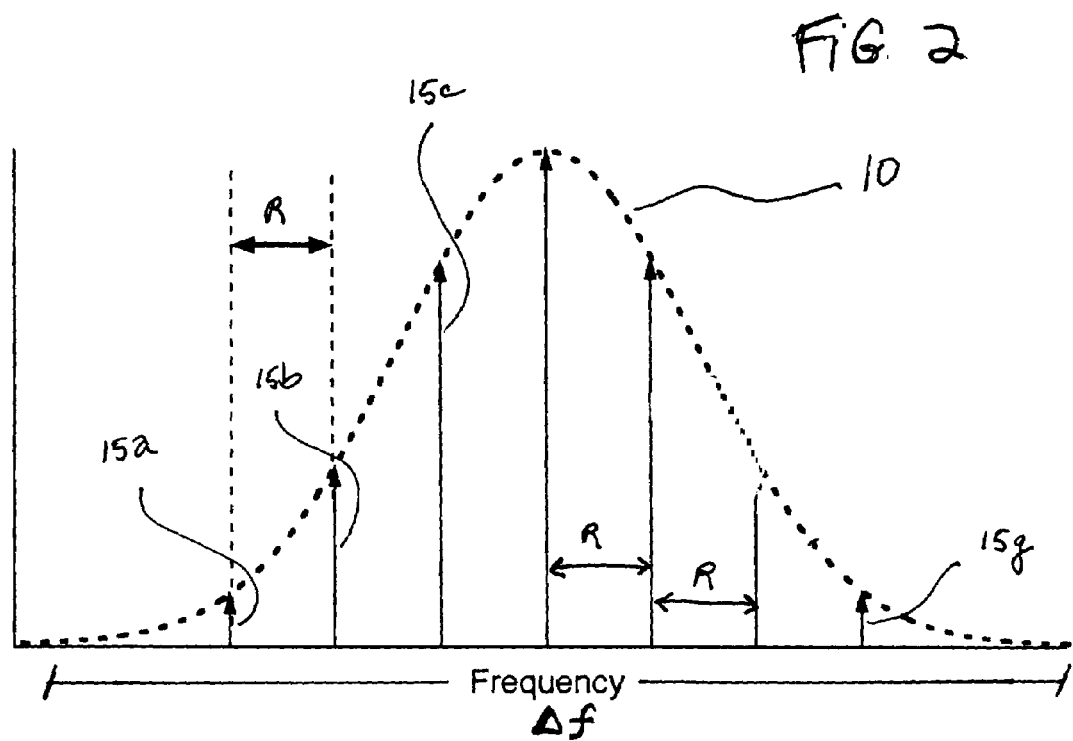
FIG. 2 is a graphical illustration showing an optical pulse comprising various frequencies and the repetition rate for each frequency.

According to the invention, the optical pulse 120 that enters the all-pass optical filter comprises a regular unmodulated pulse train. By defining the pulse train as "regular" herein, it is meant that the pulse train has a regular repetition rate as illustrated in FIG. 2 and described above, i.e., each of the frequencies of the pulse train differ from another (i.e., adjacent) frequency of the pulse train by the same amount which is represented in FIG. 2 as value "R." When this optical pulse enters the all-pass optical filter, a portion of the pulse is provided to the feedback path 145 and circulates therein. At each pass of the optical pulse in the feedback path 145, some portion thereof is provided through the splitter/combiner 143 to the output port 150, which incrementally reduces the portion of the optical pulse introduced into the feedback path 145, in effect removing it therefrom. The length of the feedback path 145 is typically shorter than the optical pulse length. Thus, as the input optical pulse 120 repeatedly circulates along the feedback path 145, it interferes with itself. That is, leading edge portions of the optical signal circulating in the feedback path interfere with trailing edge portions of the optical signal being input thereto. Interference between the leading and trailing edges of the optical pulse applies a frequency-dependent time delay to the frequencies of the optical pulse. After the frequency-dependent time delays are applied to each frequency of the optical pulse, the pulse is output from the filter through the output port 150.

Figure 5:
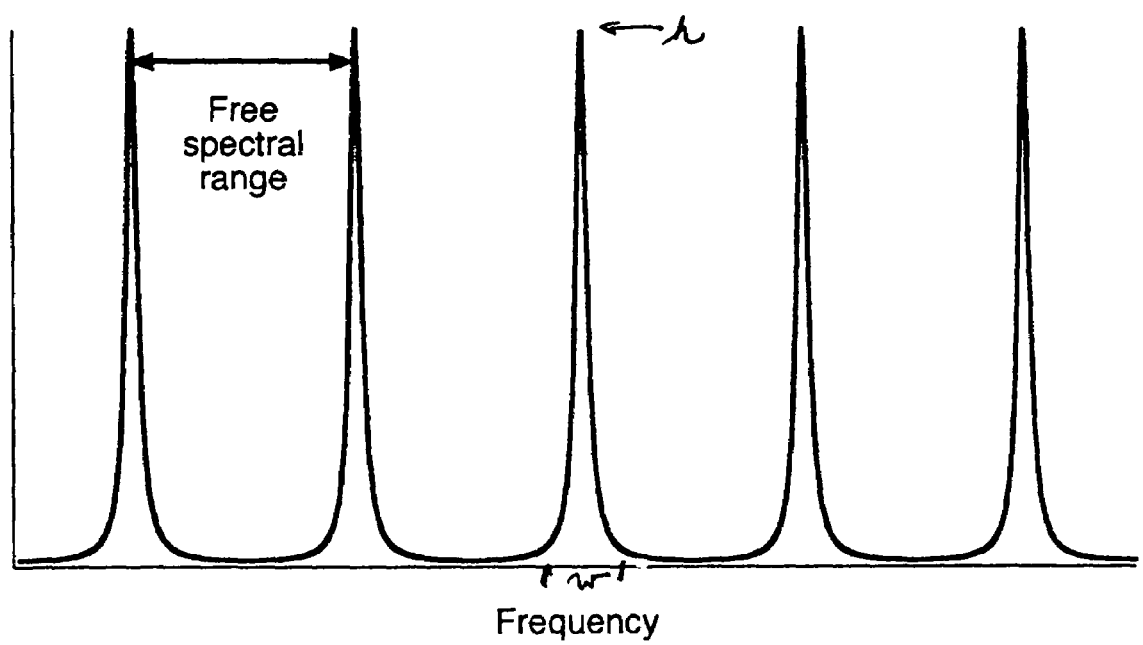
FIG. 5 is a graph illustrating the normalized group delay as a function of frequency for one embodiment of the inventive all-pass optical filter where the FSR is equal to the repetition rate of the input pulse train.

The time delay applied by the filter can be determined by the filter design and adjusted with the application of heat to the feedback path 145. Thus, at least one heater 185 advantageously is coupled to the feedback path, as shown. Coupling ratios for the splitter/combiner 143 and feedback path 145 determine the portions of the optical pulse 120 that are coupled into and away from the feedback path and thus impact upon the value for the frequency-dependent time delay that is applied. The coupling coefficient κ for the ring determines the height and width of each time-delay peak, and the phase φ for the ring determines the value of the FSR between each delay peak. Thus, the height and width of each delay peak is determined by the coupling coefficient κ which is configured into the device design. To illustrate, FIG. 5 is a graph of the normalized group delay as a function of frequency for five consecutive FSR's of the single-stage all-pass optical filter. As can be seen, the filter has a time delay spectrum consisting of five peaks spaced from each other by the FSR. The value for the FSR can be determined depending on the phase φ of the resonator ring, and the height "h" and width "w" of each delay peak can be determined depending on the coupling coefficient κ. Additionally, heat may be applied to adjust the values for κ and φ as would be suitable for the particular signal being input to the all-pass optical filter. Considerations involved in designing κ and φ are described in Kazarinov et al. application incorporated herein and can be determined by one skilled in the field depending on the particular input signal and desired delay period.

According to one embodiment of the invention, an all-pass optical filter is configured having a time delay spectrum where the FSR of the delay peaks (FIG. 5) is equal to the repetition rate "R" of the input pulse (e.g., FIG. 2). When the FSR is equal to the repetition rate of the optical pulse rather than the full bandwidth of the signal, each frequency of the pulse train is delayed for the same maximum amount, e.g., each frequency is delayed for the period of time represented by the maximum height "h" of each delay peak of FIG. 5. Consequently, the entire signal is delayed for the same time period.

Figure 6:
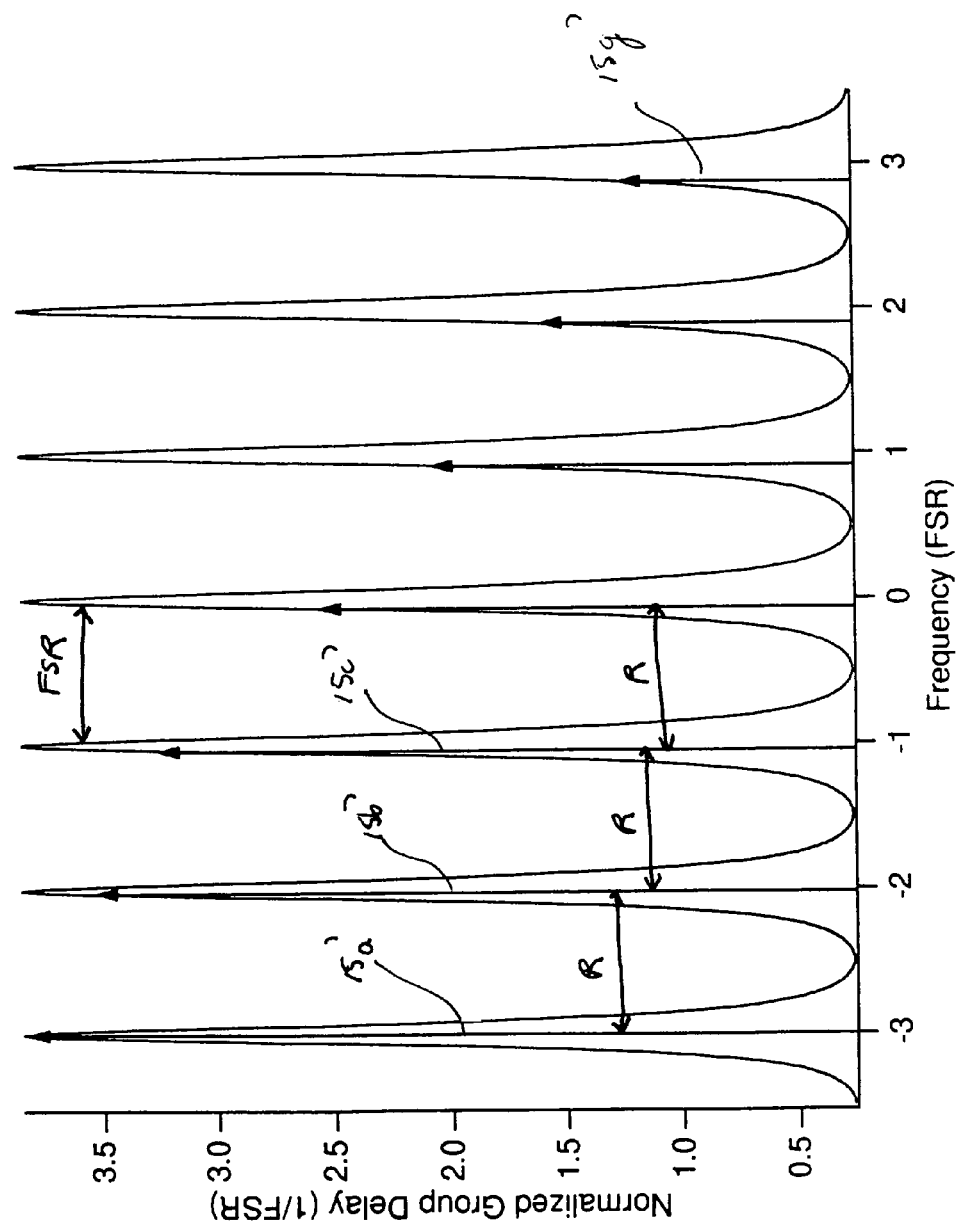
FIG. 6 is a graph illustrating the normalized group delay as a function of frequency for an alternative embodiment of the inventive all-pass optical filter where the FSR is slightly offset from the repetition rate of the input pulse train.

In an alternative embodiment, the FSR is slightly offset from the repetition rate of the input pulse train. For example, FIG. 6 shows the frequencies of a pulse train denoted by arrows 15a′, 15b′, 15c′ . . . 15g′, superimposed on a plot of the filter's time delay spectrum. Here, as can be seen the value for the FSR is denoted as reflecting an arbitrary unit of 1, and the value for the repetition rate "R" is slightly less than 1. Consequently, the first frequency of the pulse train 15a′ will experience the maximum peak delay and each frequency thereafter experiences a slightly different (in this case lesser) delay. When the differences in the delay periods follow a linear path, the device can correct for linear chirp on the pulse train. This embodiment thus may be used inside a laser cavity as a dispersion-compensating element. Certain lasers, such as pulsed lasers, have a regular repetition rate and suffer from chirp. Such lasers would be particularly well-suited for use with the single-stage all-pass optical filter of this invention, as the filter can function to equalize the chirped pulses. In each case the degree to which the repetition rate is offset from the FSR will depend upon the phase of the pulse train, the extent of chirp sought to be corrected, and how much dispersion is sought to be generated. However, typically the repetition rate will be offset from the FSR by an amount of about 10% of the value for the FSR.

Figure 7A:
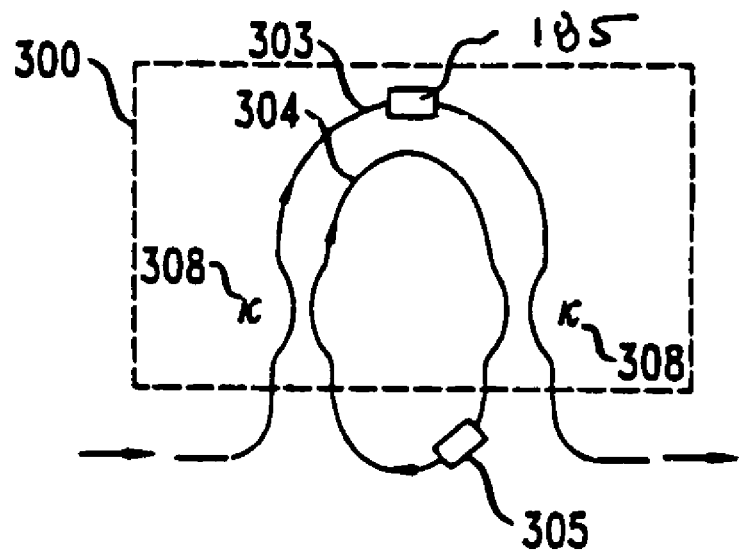
FIGS. 7A–7B are schematic illustrations of single-stage all-pass optical filters with a Mach-Zehnder interferometer structure.
Figure 7B:
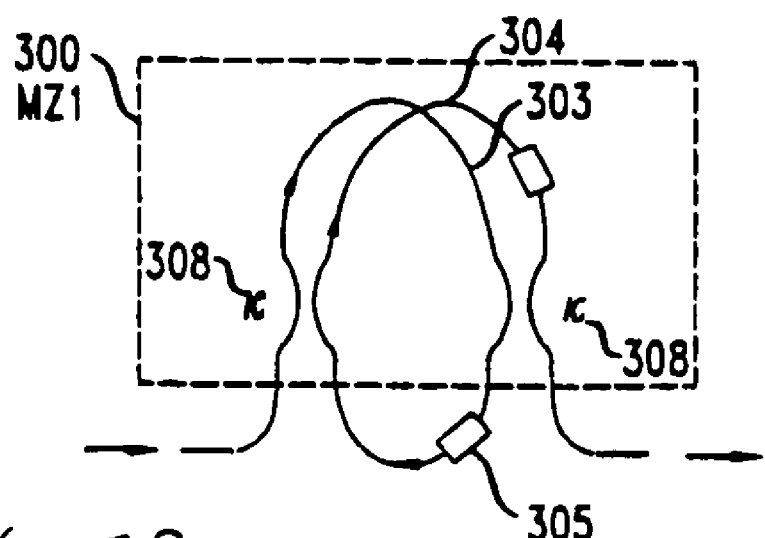

Preferably, the feedback path of the all-pass optical filter is arranged in parallel with a Mach-Zehnder interferometer (MZI), as shown in FIGS. 7A and 7B. The MZI is denoted schematically within boxed region 300. In this embodiment, two heaters 185, 305 are placed along waveguide arms 303, 304 wherein one heater 185 may be used to adjust the coupling coefficient κ and the other heater 305 may be used to adjust the phase φ of the device. The MZI structure has more than one coupler, denoted as 308, 308, which optionally may be identical. The MZI structures are folded to minimize any increase in the feedback path length. In FIG. 7A, the path lengths of the waveguide arms 303, 304 are slightly different which provides flexibility for designing wavelength dependent feedback coupling. In FIG. 7B, the path lengths of each arm 303, 304 are crossed and thus made substantially equal. With the structure of FIG. 7B, the optical signal loss can reduced by increasing the crossing angle for the waveguide arms. Crossing the arms in advantageous for achieving large feedback coupling because the effective κ can be made large without affecting fabrication tolerances.

Figure 8:
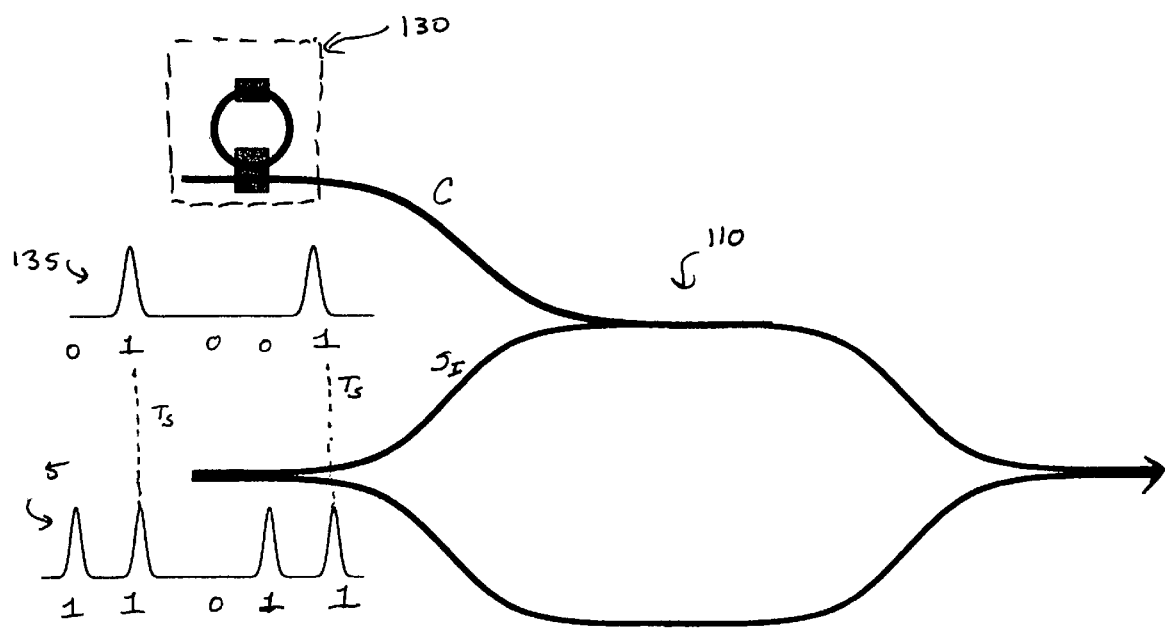
FIG. 8 is a schematic illustration of an all-optical time DEMUX having on-chip synchronization.

A signal having the regular pulse train and repetition rate, as illustrated in FIG. 2, is not particularly advantageous in itself for transmitting information in an optical communications system. However, applicants have discovered that the inventive single-stage all-pass filter as used with a signal having a regular repetition rate is advantageous in synchronizing control signals in an optical time-division multiplexer/demultiplexer system. To illustrate, FIG. 8 is a schematic representation of an all-optical time demultiplexer having on-chip synchronization. A high-speed optical signal $S_I$ received from a multiplexer (not shown) is input to the switch 110 or demultiplexer. The input signal $S_I$ contains a plurality of pulses (e.g., at 125) traveling at high speed which may correspond to information received from a number of different sources. A control signal "C" also is input to the switch 110 containing a plurality of signal pulses 135. For the control signal "C" to operate to remove select pulses from the input signal $S_I$, the control signals must overlap in time or in other words, be synchronized with the input signal, so that they arrive within the switch at the same time, e.g., as seen on FIG. 8, two pulses of control signal 135 are synchronized with pulses of input signal 125 following dashed lines $T_S$. The inventive all-pass optical filter 130 may be incorporated on the control line to delay the timing of the control signal so that it will be synchronized in time with pulses of the input signal $S_I$. The single-stage all-pass optical filter is advantageous as it is less complicated than other devices, such as multiple-stage all pass optical filters, achieves a constant time delay over a wide range of frequencies, affects only the phase of the signal, not the amplitude, and can be integrated on the same chip as the switch. Thus, it is useful in achieving high-speed integrated opto-electronic devices.

It is understood that the embodiments described herein are merely exemplary and that a person skilled in the art may make variations and modifications without departing from the spirit and scope of the invention. For example, although the single-stage optical all-pass filter is described primarily with regard to its applications in correcting linear chirp of a pulsed laser and delaying a control signal of an OTDM system, other applications may be recognized by one skilled in the field. All such variations and modifications are intended to be included within the scope of the appended claims.

We claim:
1. An optical communication system, comprising:
a signal source configured to provide an input optical pulse train having a regular repetition rate; and
an all-pass optical filter optically coupled to the signal source and configured to receive the input optical pulse train, wherein the all-pass optical filter has only a single feedback path that is configured to apply a time delay spectrum to the input optical pulse train, and a free spectral range of the all-pass optical filter is matched to the regular repetition rate of the input optical pulse train to produce an output optical pulse train delayed in time relative to the input optical pulse train.

2. The system of claim 1 in which the single feedback path comprises a ring resonator and a heating element for heating a section of the ring resonator.

3. The system of claim 1 in which the all-pass optical filter is arranged in parallel with a Mach-Zehnder interferometer.

4. The system of claim 1 in which the free-spectral range of the all-pass optical filter is matched to the regular repetition rate of the input optical pulse train by the free-spectral range being substantially equal to the regular repetition rate.

5. The system of claim 4, further including an optical multiplexer/demultiplexer device, wherein the all-pass optical filter is used to synchronize control signals with signals input to the optical multiplexer/demultiplexer device.

6. The system of claim 1, wherein the time delay spectrum has a plurality of time delay peaks, and the free-spectral range of the all-pass optical filter is matched to the regular repetition rate of the input optical pulse train by the free-spectral range being offset from the regular repetition rate by a sufficiently small degree that each frequency of the input optical pulse train falls within a bandwidth of one of the plurality of time delay peaks.

7. The system of claim 6, wherein the signal source comprises a pulsed laser, and the all-pass optical filter is configured to reduce linear chirp of the pulsed laser.

8. A method of operating an all-pass optical filter, comprising:

providing an all-pass optical filter with an input and only a single feedback path;

providing an optical pulse train having a regular repetition rate to the input; and matching a free spectral range of the all-pass optical filter to the regular repetition rate of the optical pulse train.

9. The method of claim 8, in which the free-spectral range of the filter is matched to the regular repetition rate of the optical pulse train by the free-spectral range being substantially equal to the regular repetition rate.

10. The method of claim 8, wherein the time delay spectrum has a plurality of time delay peaks, and the free-spectral range of the filter is matched to the repetition rate of the optical pulse train by the free-spectral range being offset from the regular repetition rate by a sufficiently small degree that each frequency of the optical pulse train falls within a bandwidth of one of the plurality of time delay peaks.

* * * * *